United States Patent
Yoon et al.

(10) Patent No.: US 6,489,425 B1
(45) Date of Patent: Dec. 3, 2002

(54) STYRENE/MACROMONOMER RANDOM POLYMER HAVING EXCELLENT MELT FLOWABILITY AND IMPACT STRENGTH AND METHOD OF PREPARING THE SAME

(75) Inventors: Keun-Byoung Yoon, Taejeon (KR); Jin Heong Yim, Taejeon (KR); Yi-Yeol Lyu, Taejeon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 260 days.

(21) Appl. No.: 09/639,237

(22) Filed: Aug. 16, 2000

(30) Foreign Application Priority Data

Aug. 16, 1999 (KR) ............................................. 99-33723
Nov. 4, 1999 (KR) ............................................. 99-48607

(51) Int. Cl.[7] ............................................. C08F 112/06
(52) U.S. Cl. ................... 526/347.1; 526/265; 526/279; 526/307.8; 526/329.2; 526/332; 526/340; 526/342; 526/347
(58) Field of Search ................ 526/265, 279, 526/307.8, 329.2, 332, 340, 342, 347, 347.1

(56) References Cited

U.S. PATENT DOCUMENTS

| | | | | |
|---|---|---|---|---|
| 4,722,976 A | * | 2/1988 | Ceska | 525/301 |
| 5,278,244 A | * | 1/1994 | Babu | 525/292 |
| 6,306,995 B1 | * | 10/2001 | Wang | 526/348 |

FOREIGN PATENT DOCUMENTS

| | | |
|---|---|---|
| JP | 4-13707 | 1/1992 |
| JP | 5-295056 | 11/1993 |

OTHER PUBLICATIONS

K. Endo, et al.; Syndiospecific Copolymerization of Styrene with Styrene Macromonomer, etc., 1999; pp. 5977–5980.
K. Endo, et al., Syndiospecific Copolymerization of Styrene with Styrene Terminated Isoprene, Etc.; 1998, pp. 563–566.

* cited by examiner

*Primary Examiner*—Helen L. Pezzuto
(74) *Attorney, Agent, or Firm*—Lee & Sterba, P.C.

(57) ABSTRACT

A styrene random copolymer includes at least one unit of styrene derivative and at least one unit of macromonomer. The at least one unit of styrene derivative is polymerized from a styrene derivative monomer of formula (1). The at least one unit of macromonomer is polymerized from a macromonomer of formula (2).

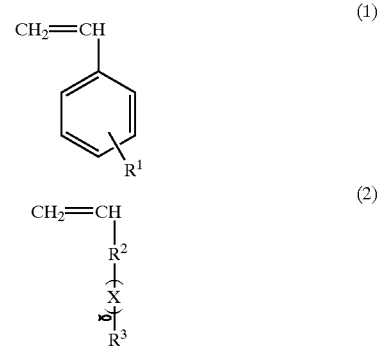

In formulae (1) and (2), $R^1$ is selected from the group consisting of hydrogen, halogen, and alkyl groups with 1~20 carbon atoms, $R^2$ is at least one selected from the group consisting of saturated hydrocarbons with 1~20 carbon atoms, aromatic groups, and cycloalkyl groups with the proviso that $R^2$ is not —CO— or —$CH_2$—$C_6H_4$—, $R^3$ is a saturated hydrocarbon group with 1~10 carbon atoms, X is at least one ion polymerizable monomer unit.

The amount of the macromonomer is 0.1~50% by weight based on the weight of the random copolymer, and the weight average molecular weight of the random copolymer ranges from about 50,000 to about 2,000,000.

34 Claims, 2 Drawing Sheets

STYRENE/MACROMONOMER RANDOM POLYMER HAVING EXCELLENT MELT FLOWABILITY AND IMPACT STRENGTH AND METHOD OF PREPARING THE SAME

FIELD OF THE INVENTION

The present invention relates to a styrene/macromonomer random copolymer. More specifically, the present invention relates to a styrene/macromonomer random copolymer that has excellent melt flowability as well as good heat resistance, chemical resistance, dimensional stability, elongation, flexural strength, impact strength, compatibility, and electrical properties. The present invention includes a method of preparing the styrene copolymer. Also, the present invention relates to a styrene/styrene derivative/macromonomer random terpolymer and a method of preparing the terpolymer.

DESCRIPTION OF THE RELATED ART

In general, a styrene resin is prepared by radical polymerization. Since a styrene resin prepared by radical polymerization has an atactic structure as a whole, it has poor heat resistance and chemical resistance. A styrene resin with stereoregularity is prepared in the form of an isotactic structure or a syndiotactic structure. The former is polymerized by using a Ziegler catalyst and the latter is polymerized by using a uniform catalyst consisting of a titanium compound such as halogen titanium, alkoxy titanium, etc. with an alkylaluminoxane.

The styrene resin having a syndiotactic structure has good heat resistance and chemical resistance, but, on the other hand, it has poor impact strength. In order to overcome these shortcomings, methods of mixing a rubber, an inorganic filler, etc. have been attempted, such methods have limited usage. Further, since the melting point of the styrene resin is about 270° C. and the degradation temperature is 310° C., it is not easy to carry out such a process.

Recently, macromonomers with polymerization activity at the end of the chain have been developed and applied to various uses. The present inventors have developed a styrene/macromonomer random copolymer that has excellent melt flowability as well as good heat resistance, chemical resistance, dimensional stability, elongation, flexural strength, impact strength, compatibility, and electrical properties, which are required for engineering plastics. Further, the present inventors have developed a styrene/styrene derivative/macromonomer random terpolymer having excellent melt flowability as well as impact strength and other physical properties.

A feature of the present invention is the provision of a styrene random copolymer having excellent melt flowability, which is prepared by copolymerization of a styrene derivative monomer and a macromonomer and which is useful for engineering plastics having good heat resistance.

Another feature of the present invention is the provision of a styrene random copolymer prepared by copolymerization of a styrene derivative monomer and a macromonomer, which has good heat resistance, chemical resistance, dimensional stability, elongation, flexural strength, impact strength, compatibility, and electrical properties.

A further feature of the present invention is the provision of a method of preparing the styrene random copolymer prepared by copolymerization of a styrene derivative monomer and a macromonomer.

A further feature of the present invention is the provision of a styrene random terpolymer having excellent melt flowability, which is prepared by polymerization of a styrene monomer, a styrene derivative, and a macromonomer and which is useful for engineering plastics having good heat resistance.

A further feature of the present invention is the provision of a styrene random terpolymer prepared by polymerization of a styrene monomer, a styrene derivative, and a macromonomer, which has good heat resistance, chemical resistance, dimensional stability, elongation, flexural strength, impact strength, compatibility, and electrical properties.

A further feature of the present invention is the provision of a method of preparing the styrene random terpolymer by polymerization of a styrene monomer, a styrene derivative, and a macromonomer.

The above and the other features and advantages of this invention will be apparent from the ensuing disclosure and appended claims.

SUMMARY OF THE PREFERRED EMBODIMENTS

The styrene random copolymer according to the present invention is produced by copolymerization of a styrene monomer and a macromonomer, thus having at least two repeating units, the styrene derivative with a syndiotactic structure and the macromonomer. The macromonomer has polymerization activity via an ethylenically unsaturated group, such as a vinyl group, at the end of the chain. The repeating units of styrene derivative, and more particularly at least 50% syndiotacticity. The amount of macromonomer is about 0.1% to about 50% (0.1~50%) by weight based on the weight of the random copolymer. The melting point of the copolymer is 150~272° C., and the weight average molecular weight is in the range of about 50,000 to about 2,000,000 when it is measured by gel permeation chromatography.

Thus, according to one aspect of the present invention, a styrene random copolymer is provided that includes at least one unit of styrene derivative and at least one unit of macromonomer, the at least one unit of styrene derivative being polymerized from a styrene derivative monomer of formula (1), the at least one unit of macromonomer being polymerized from a macromonomer of formula (2).

In the forgoing formulae,

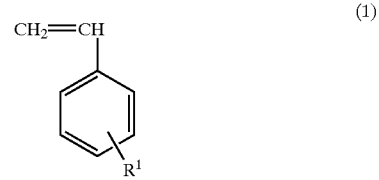

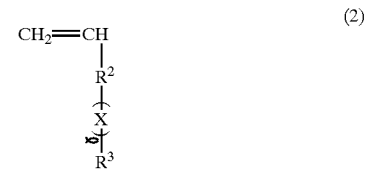

$R^1$ is selected from the group consisting of hydrogen, halogen, and alkyl groups with 1~20 carbon atoms, $R^2$ is at least one selected from the group consisting of saturated hydrocarbons with 1~20 carbon atoms, aromatic groups, and cycloalkyl groups with the proviso that $R^2$ is not —CO— or —CH$_2$—C$_6$H$_4$—, $R^3$ is a saturated hydrocarbon group with 1~10 carbon atoms, X is at least one ion polymerizable monomer unit selected from the group consisting of monomers of formulae

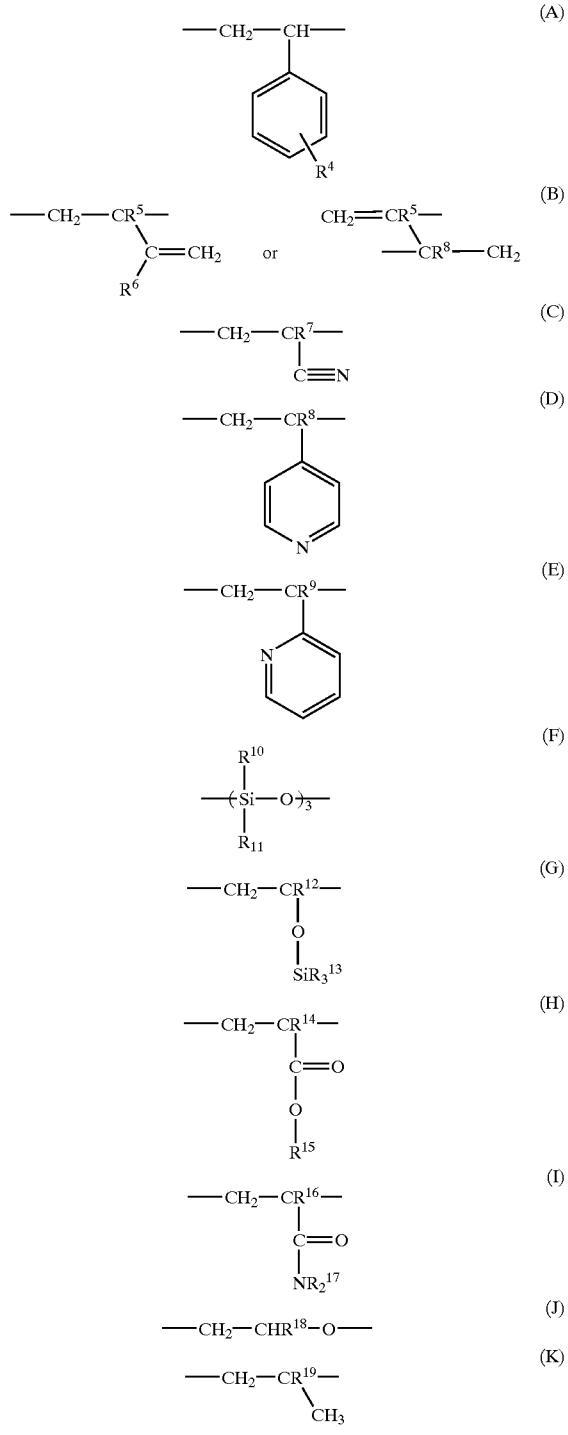

$R^4$, $R^5$, $R^6$, $R^7$, $R^8$, and $R^9$ are the same or different and are selected from the group consisting of hydrogen, halogen, alkyl groups with 1~20 carbon atoms, and alkoxy groups with 1~20 carbon atoms, $R^{10}$, $R^{11}$, $R^{12}$, $R^{13}$, $R^{16}$, and $R^{17}$ are the same or different and are selected from the group consisting of alkyl groups with 1~20 carbon atoms, $R^{14}$ and $R^{15}$ are the same or different and are selected from the group consisting of hydrogen and alkyl groups with 1~20 carbon atoms, $R^{18}$ is selected from the group consisting of hydrogen and alkyl groups with 1~4 carbon atoms, $R^{19}$ is selected from the group consisting of alkyl groups with 1~4 carbon atoms, and l is the degree of polymerization for X and is an integer from about 10 to about 1,000.

The amount of the macromonomer is 0.1~50% by weight based on the weight of the random copolymer, and the weight average molecular weight of the random copolymer ranges from about 50,000 to about 2,000,000.

According to another aspect of the present invention, the styrene random copolymer is prepared by polymerization of a styrene derivative monomer and a macromonomer in the presence of a catalyst comprising a transition metal compound, more particularly a Group IV transition metal compound, and an alkylaluminoxane.

Further, the present invention includes a styrene random terpolymer that is copolymerized from a styrene monomer, a styrene derivative, and a macromonomer, thus having at least three repeating units, the two styrenes with a syndiotactic structure and the macromonomer. The macromonomer has a polymerization activity viaan ethylenically unsaturated group, such as a vinyl group, at the end of the chain. The repeating units of the styrene, and more particularly have at least 50% syndiotacticity. The amount of macromonomer is about 0.1 to about 50% by weight based on the weight of the random terpolymer. The melting point of the terpolymer is 150~272° C., and the weight average molecular weight is in the range of about 50,000 to about 5,000,000 when it is measured by gel permeation chromatography.

Thus, in accordance with an additional aspect of the present invention, there is provided a styrene random terpolymer comprising units of styrene monomer, units of styrene derivative, and units of macromonomer, the units of styrene monomer being polymerized from a styrene monomer of formula (1$_s$), the units of styrene derivative being polymerized from a styrene derivative monomer of formula (1), the units of macromonomer being polymerized from a macromonomer of formula (2),

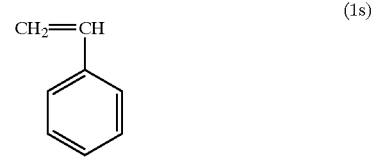

(1s)

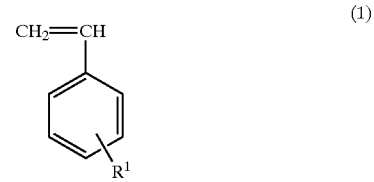

(1)

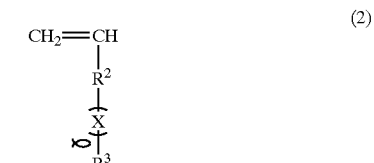

(2)

said terpolymer being represented by formula (III):

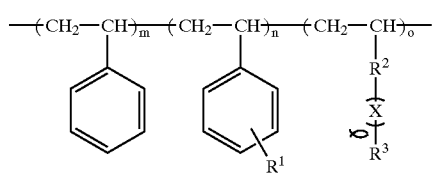

In the foregoing formulae, $R^1$ is selected from the group consisting of hydrogen, halogen, and alkyl groups with 1~20 carbon atoms, $R^2$ is at least one selected from the group consisting of saturated hydrocarbons with 1~20 carbon atoms, aromatic groups, and cycloalkyl groups with the proviso that $R^2$ is not —CO— or $CH_2$—$C_6H_4$—, $R^3$ is selected from the group consisting of saturated hydrocarbons with 1~10 carbon atoms, m is a degree of polymerization for the styrene monomer and is an integer of about 400 to about 20,000, n is a degree of polymerization for the styrene derivative monomer and is an integer of about 5 to about 200, o is a degree of polymerization for the macromonomer and is an integer of about 1 to about 20, l is the degree of polymerization for X and is an integer of about 10 to about 3,000, and X is at least one ion polymerizable monomer unit selected from the group consisting of monomers of formulae (A) to (K):

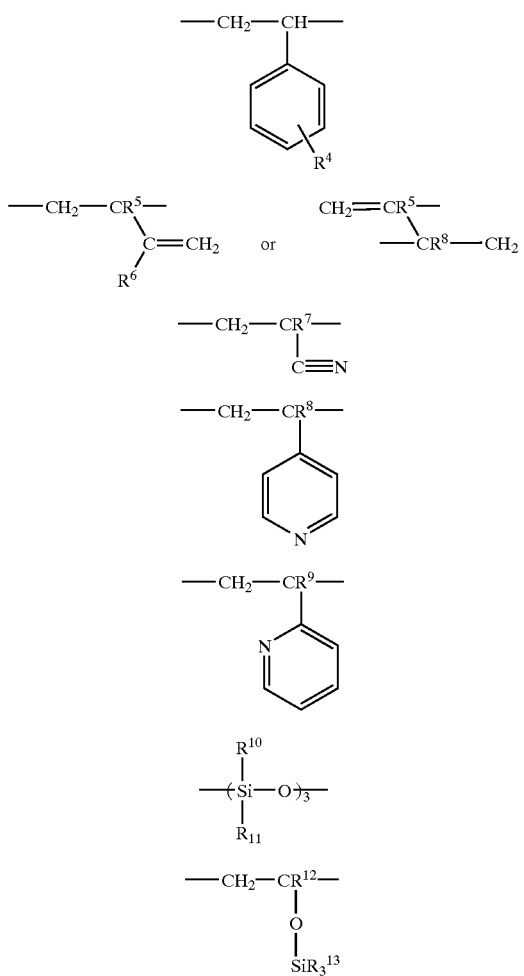

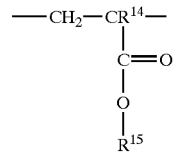

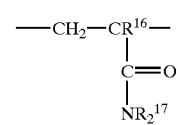

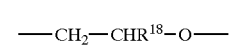

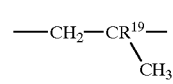

$R^4$, $R^5$, $R^6$, $R^7$, $R^8$, and $R^9$ are the same or different and are selected from the group consisting of hydrogen, halogen, alkyl groups with 1~20 carbon atoms, and alkoxy groups with 1~20 carbon atoms, $R^{10}$, $R^{11}$, $R^{12}$, $R^{13}$, $R^{16}$, and $R^{17}$ are the same or different and are selected from the group consisting of alkyl groups with 1~20 carbon atoms, $R^{14}$ and $R^{15}$ are the same or different and chosen from hydrogen and alkyl groups with 1~20 carbon atoms, $R^{18}$ is selected from the group consisting of hydrogen and alkyl groups with 1~4 carbon atoms, and $R^{19}$ is selected from the group consisting of alkyl groups with 1~4 carbon atoms.

The amount of the macromonomer is 0.1~50% by weight based on the weight of the random terpolymer, and the weight average molecular weight of the random terpolymer ranges from about 50,000 to about 5,000,000.

According to a further aspect of the present invention, the styrene random terpolymer is prepared in the presence of a catalyst comprising a transition metal compound, more particularly a Group IV transition metal compound, and an alkylaluminoxane.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE INVENTION

Figure 1:
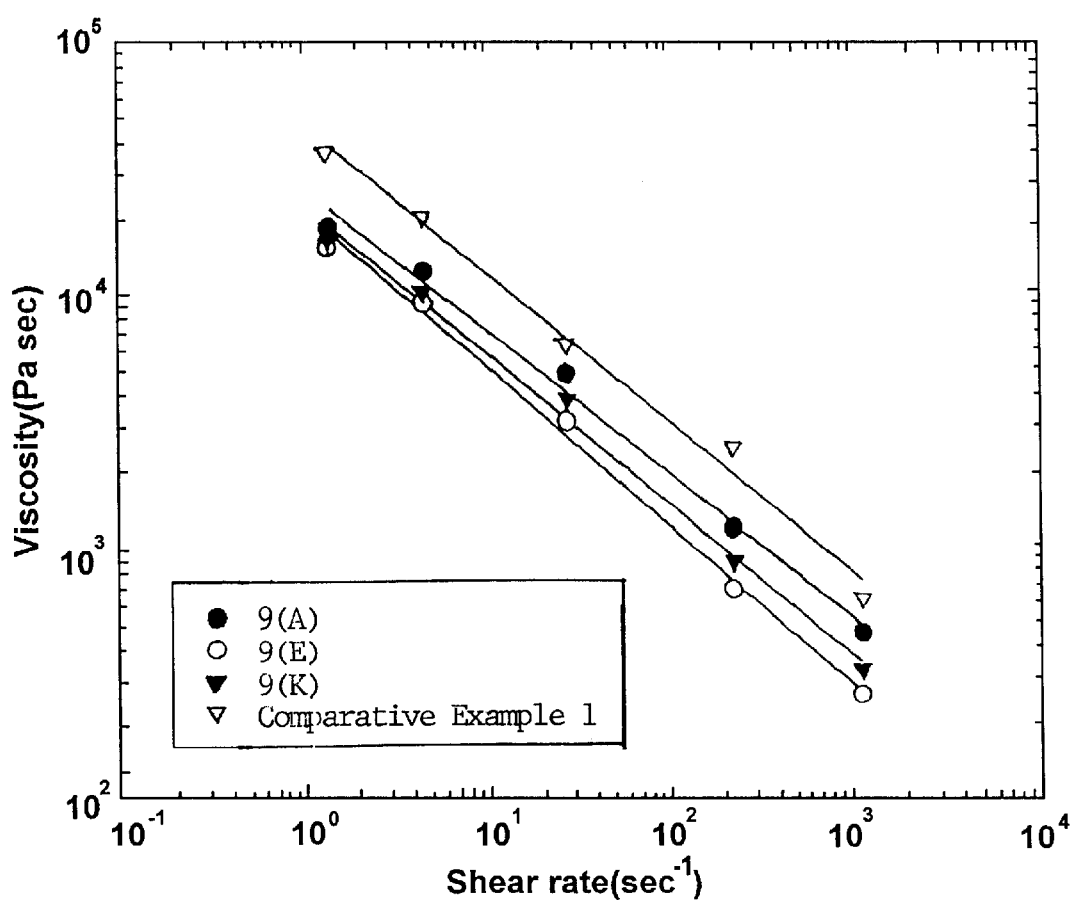
FIG. 1 is a graph of shear viscosity measured at 290° C., of the random copolymers of Examples 9(A), 9(E), and 9(K) and of a styrene homopolymer of Comparative Example 1 to measure the melt flowability of the random copolymer.

The priority Korean Patent Application No. 1999-33723, filed Aug. 16, 1999, is incorporated herein in its entirety by reference.

The styrene random copolymer according to the present invention is produced by copolymerizing a styrene derivative monomer and a macromonomer, thus having at least two repeating units, the styrene with a syndiotactic structure and the macromonomer. The macromonomer has polymerization activity via an ethylenically unsaturated group, such as a vinyl group, at the end of the chain. The repeating units of styrene derivative, and more particularly have at least 50% syndiotacticity. The amount of macromonomer is 0.1~50% by weight in the random copolymer. The melting point of the copolymer is at 150~272° C., and the weight average molecular weight is in the range of about 50,000 to about 2,000,000 when it is measured by gel permeation chromatography. The styrene random copolymer of the present invention is prepared by polymerization of a styrene derivative monomer and a macromonomer in the presence of a catalyst comprising a transition metal compound and an alkylaluminoxane.

The styrene random copolymer consists of the following styrene derivative repeating unit (I) and one or more of the following macromonomer repeating unit (II):

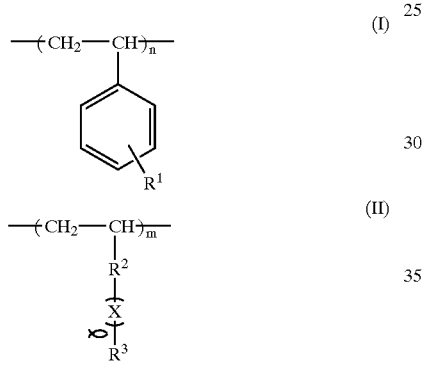

wherein $R^1$ is hydrogen, a halogen, or an alkyl group containing about 1 to about 20 (1~20) carbon atoms, $R^2$ is a saturated hydrocarbon group containing 1~20 carbon atoms, such as a linear alkyl containing 1~10 carbons, an aromatic group, or a cycloalkyl group with the proviso that $R^2$ is not —CO— or —CH$_2$—C$_6$H$_4$—, $R^3$ is a saturated hydrocarbon group containing 1~10 carbon atoms, X is an ion polymerizable monomer for synthesizing the macromonomer and is represented by one of the following structural formulae (A) to (K), n is a degree of polymerization for the styrene repeating unit and is an integer in the range of about 500 to about 20,000, m is a degree of polymerization for the macromonomer repeating unit and is an integer in the range of about 1 to about 500, and l is the degree of polymerization for X and is an integer in the range of about 10 to about 1,000.

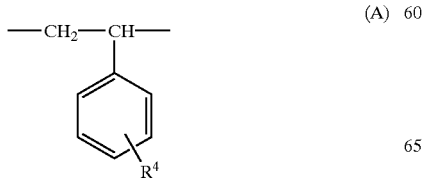

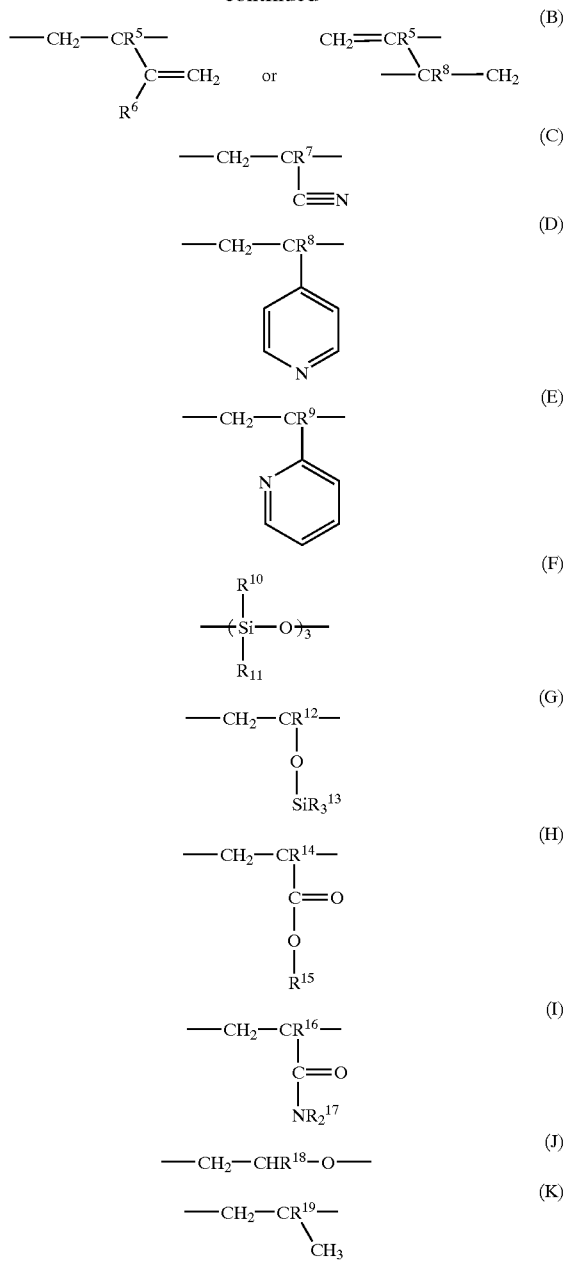

wherein $R^4$, $R^5$, $R^6$, $R^7$, $R^8$, and $R^9$ are the same or different and are hydrogen, a halogen, or an alkyl or alkoxy group containing 1~20 carbon atoms, $R^{10}$, $R^{11}$, $R^{12}$, $R^{13}$, $R^{16}$, and $R^{17}$ are the same or different and are an alkyl group containing 1~20 carbon atoms, $R^{14}$ and $R^{15}$ are the same or different and are hydrogen or an alkyl group containing 1~20 carbon atoms, $R^{18}$ is hydrogen or an alkyl group containing 1~4 carbon atoms, and $R^{19}$ is an alkyl group containing 1~4 carbon atoms.

To prepare the styrene random copolymer of the present invention, a styrene derivative monomer represented by the following general formula (1) and a macromonomer represented by the following general formula (2) are copolymerized:

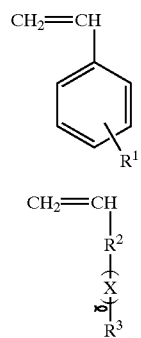
(1)

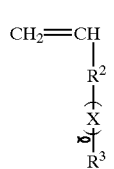
(2)

wherein $R^1$ is hydrogen, a halogen, or an alkyl group containing 1~20 carbon atoms, $R^2$ is a saturated hydrocarbon containing 1~20 carbon atoms-, such as a linear alkyl containing 1~10 carbons, an aromatic group or a cycloalkyl group with the proviso that $R^2$ is not —CO— or —CH$_2$—C$_6$H$_4$R$^3$ is a saturated hydrocarbon containing 1~10 carbon atoms, and l is the degree of polymerization for X and is an integer in the range of about 10 to about 1,000.

The styrene monomer used to prepare the styrene random copolymer of the present invention is commercially available. Typical examples of the styrene monomer are styrene; halogenated styrene such as o-, m-, p-chlorostyrene, o-, m-, p-bromostytrene, and o-, m-, p-fluorostyrene; and alkylstyrene such as o-, m-, p- methylstyrene, o-, m-, p- ethylstyrene, o-, m-, p- propylstyrene, o-, m-, p- butylstyrene, o-, m-, p-tert-butylstyrene, etc.

The macromonomer used as a comonomer in this invention is prepared by polymerizing an ion polymerizable monomer represented by the general formula (2) using an ionic initiator, and reacting the resulting macromonomer with a halogenated unsaturated hydrocarbon compound so as to forman ethylenically unsaturated group, such as a vinyl group, showing polymerization activity at the end of the chain.

The macromonomer represented as the general formula (2) is prepared variously depending upon the species of monomer, and X in the formula (2) is the repeating unit of monomer having ion polymerization ability.

The monomers having ion polymerization ability are monomers represented by the following general formulae (a) to (k):

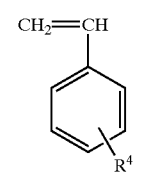
(a)

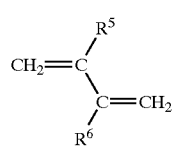
(b)

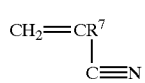
(c)

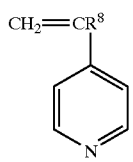
(d)

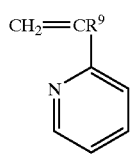
(e)

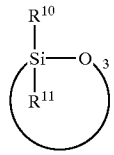
(f)

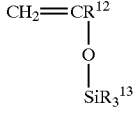
(g)

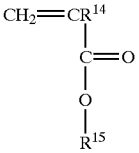
(h)

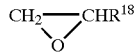
(j)

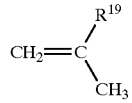
(k)

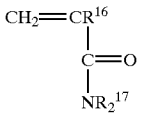
(i)

wherein $R^4$, $R^5$, $R^6$, $R^7$, $R^8$, and $R^9$ are the same or different and are a hydrogen, a halogen, or an alkyl group or an alkoxy group containing 1~20 carbon atoms, $R^{10}$, $R^{11}$, $R^{12}$, $R^{13}$, $R^{16}$, and $R^{17}$ are the same or different and are an alkyl group containing 1~20 carbon atoms, $R^{14}$ and $R^{15}$ are the same or different and are hydrogen or an alkyl group containing 1~20 carbon atoms, $R^{18}$ is hydrogen or an alkyl group containing 1~4 carbon atoms, and $R^{19}$ is an alkyl group containing 1~4 carbon atoms.

Typical examples of the donor monomers showing ion polymerization ability are olefins such as isobutylene and isopentene; dienes such as isoprene, 1,3-butadiene, 2-fluoro-1,3-butadiene, 2,3-dichloro-1,3-butadiene, etc; styrene; halogenated styrenes such as o-, m-, p-chlorostyrene, o-, m-, p-bromostyrene, and o-, m-, p-fluorostyrene; alkylstyrenes such as o-, m-, p-methylstyrene, o-, m-, p-ethylstyrene, o-, m-, p-propylstyrene, o-, m-, p-butylstyrene, o-, m-, p-tert-butylstyrene, etc; acrylonitrile; ethylene oxide; propylene oxide; hexamethylcyclotrisiloxane; vinylsiloxane; vinyl acetates; methacrylates; methacrylic acids; methacrylamides; 2-vinylpyridine; 4-vinylpyridine; etc.

To prepare a macromonomer according to the present invention, the ion polymerizable monomer can be used singly and a mixture of at least two monomers can also be used. Thus, the macromonomer can be a homo, random or block macromonomer.

An initiator is employed for polymerization of the ion polymerizable monomer. Representative initiators include alkali metals such as cesium, rubidium, potassium, sodium, lithium, etc and alkali metal compounds such as n-butyl lithium, sec-butyl lithium, tert-butyl lithium, lithium diisopropylamide, octyl potassium, lithium trimethyl silanonate, butyl magnesium bromide, etc.

The weight average molecular weight of the macromonomer is preferably in the range of about 1,000 to about 200,000, most preferably greater than 10,000, such as between 10,000 and 200,000.

The styrene random copolymer of the present invention is prepared by copolymerization of a styrene monomer and a macromonomer in the presence of a catalyst comprising a transition metal compound and an alkylaluminoxane.

The styrene repeating unit in the styrene random copolymer has at least 50% syndiotacticity. The amount of macromonomer in the random copolymer preferably is 0.1~50% by weight preferably. The melting point of the styrene random copolymer is at 150~272° C. and the weight average molecular weight analyzed by gel permeation chromatography preferably is in the range of about 50,000 to about 2,000,000.

Further, a styrene random terpolymer according to the present invention is polymerized with a styrene monomer, a styrene derivative, and a macromonomer, thus having three repeating units, namely the two styrenes with a syndiotactic structure and the macromonomer. The macromonomer has polymerization activity via an ethylenically unsaturated group, such as a vinyl group, at the end of the chain. The repeating unit of styrenes has at least 50% syndiotacticity. The amount of macromonomer is 0.1~50% by weight in the random copolymer. The melting point of the copolymer is 150~272° C., and the weight average molecular weight is in the range of about 50,000 to about 5,000,000 when it is measured by gel permeation chromatography. The styrene random terpolymer of the present invention is prepared by polymerization of a styrene monomer, a styrene derivative, and a macromonomer in the presence of a catalyst comprising a transition metal compound and an alkylaluminoxane.

The styrene random terpolymer is represented by the following formula (III):

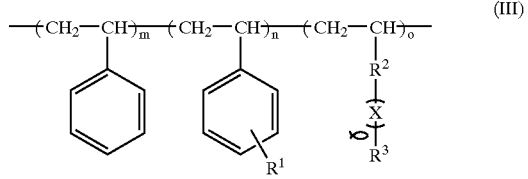

(III)

wherein $R^1$ is hydrogen, a halogen, or an alkyl group containing 1~20 carbon atoms, $R^2$ is a saturated hydrocarbon containing 1~20 carbon atoms, such as a linear alkyl containing 1~10 carbons, an aromatic group or a cycloalkyl group with the proviso that $R^2$ is not —CO— or —CH$_2$—C$_6$H$_4$—, $R^3$ is a saturated hydrocarbon containing 1~10 carbon atoms, m is an integer of about 400 to about 20,000 as a degree of polymerization for the repeating unit of styrene monomer, n is an integer of about 5 to about 200 as a degree of polymerization for the repeating unit of styrene derivative monomer, o is an integer of about 1 to about 20 as a degree of polymerization for the repeating unit of macromonomer, and l is the degree of polymerization for X and is an integer of about 10 to about 3,000.

To prepare the styrene random terpolymer of the present invention, a styrene monomer represented by the following general formula ($1_s$), a styrene derivative monomer represented by the following general formula (1), and a macromonomer represented by the following general formula (2) are polymerized:

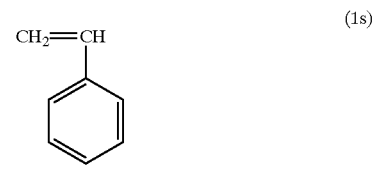

(1s)

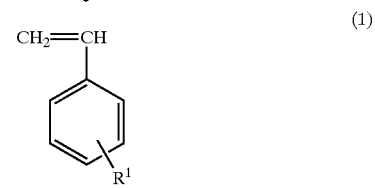

(1)

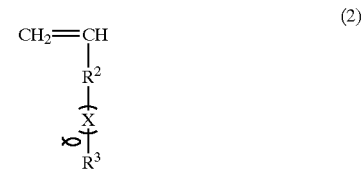

(2)

wherein $R^1$ is hydrogen, a halogen, or an alkyl group containing 1~20 carbon atoms, $R^2$ is a saturated hydrocarbon containing 1~20 carbon atoms, such as a linear alkyl containing 1~10 carbons, an aromatic group or a cycloalkyl group with the proviso that $R^2$ is not —CO— or —CH$_2$—C$_6$H$_4$—, and $R^3$ is a saturated hydrocarbon containing 1~10 carbon atoms.

The styrene derivative monomer, which is represented by the formula (1), used to prepare the styrene random terpolymer of the present invention, is commercially available. Typical examples of the styrene derivative monomer are halogenated styrene such as o-, m-, p-chlorostyrene, o-, m-, p-bromostyrene, and o-, m-, p-fluorostyrene; and alkylstyrene such as o-, m-, p-methylstyrene, o-, m-, p-ethylstyrene, o-, m-, p- propylstyrene, o-, m-, p- butylstyrene, o-, m-, p-tert-butylstyrene, etc.

The macromonomer represented by the general formula (2) used as a monomer in this invention is prepared by polymerizing at least one ion polymerizable monomer using an ionic initiator, and reacting the resulting macromonomer with a halogenated unsaturated hydrocarbon compound so as to form an ethylenically unsaturated group, such as a vinyl group, showing polymerization activity at the end of the chain.

The macromonomer represented by the general formula (2) is prepared variously depending upon the species of monomer, and X in the formula (2) is the repeating unit of monomer having ion polymerization ability. The monomers having ion polymerization ability include the same monomers represented in formulae (a) to (k) above.

Typical examples of the donor monomers showing ion polymerization ability are olefins such as isobutylene and isopentene; dienes such as isoprene, 1,3-butadiene, 2-fluoro-1,3-butadiene, 2,3-dichloro-1,3-butadiene, etc; styrene; halogenated styrenes such as o-, m-, p-chlorostyrene, o-, m-, p-bromostyrene, and o-, m-, p-fluorostyrene; alkylstyrenes such as o-, m-, p-methylstyrene, o-, m-, p-ethylstyrene, o-, m-, p-propylstyrene, o-, m-, p-butylstyrene, o-, m-, p-tert-butylstyrene, etc; acrylonitrile; ethylene oxide; propylene oxide; hexamethylcyclotrisiloxane; vinylsiloxane; vinyl acetates; methacrylates; methacrylic acids; methacrylamides; 2-vinylpyridine; 4-vinylpyridine; etc.

To prepare a macromonomer according to the present invention, the ion polymerizable monomer can be used singly and a mixture of at least two monomers can also be used. Thus, the macromonomer can be a homo, random or block macromonomer.

An initiator is employed for polymerization of the ion polymerizable monomer. Representative initiators include alkali metals such as cesium, rubidium, potassium, sodium, lithium, etc., and alkali metal compounds such as n-butyl lithium, sec-butyl lithium, tert-butyl lithium, lithium diisopropylamide, octyl potassium, lithium trimethyl silanonate, butyl magnesium bromide, etc.

The weight average molecular weight of the macromonomer is preferably in the range of about 1,000 to about 300,000, most preferably greater than 10,000, such as between 10,000 and 300,000.

The styrene random copolymer or terpolymer of the present invention is prepared in the presence of a catalyst comprising a transition metal compound, preferably a Group IV transition metal compound, more preferably a titanium compound, as a major catalyst, and an organic aluminum or an alkylaluminoxane, which is formed by reaction of organic aluminum and water, as a cocatalyst.

When a titanium compound is used as a major catalyst, the molar ratio of aluminum to titanium is from about 1:1 to about 1,000,000:1, preferably, from about 10:1 to about 10,000:1.

Bulk, solution, or suspension polymerization is available for preparing the copolymer or terpolymer according to the present invention. The temperature of polymerization is preferably in the range of about about 0 to about 90° C. and the time of polymerization is in the range of about 1 second to about 24 hours. The solvent usable in the solution polymerization includes aliphatic hydrocarbons such as pentane, hexane, and heptane and aromatic hydrocarbons such as benzene, toluene, and xylene.

The styrene terpolymer according to the present invention has a melting point about 5 to about 70° C. lower than a conventional styrene homopolymer. The temperature for processing with the terpolymer can be lowered by controlling the amount of the styrene derivative in the terpolymer. Since the styrene copolymers and terpolymers according to the invention contain the macromonomer units to form long chains, the melt flowability can be improved during the post process. The flexural modulus and Izod impact strength of the inventive copolymers and terpolymers are not reduced as much as in the styrene homopolymer although the amount of styrene derivative is increased. The inventive copolymers and terpolymers also have good compatibility with a rubber component so as to provide a resin composition with improved impact strength. In consequence, the copolymers and terpolymers of the present invention can be processed at relatively lower temperatures with not causing deterioration of other physical properties.

The present invention will be described in more details by the following Examples. The Examples are given only to illustrate the present invention and not intended in any way to limit the scope of the invention.

EXAMPLE 1

Preparation of Styrene Macromonomer

Example 1A

To a 500 ml glass reactor, which had been dried under nitrogen atmosphere, were added 80 ml of toluene and 11.5 ml of styrene, (0.1 mol), followed by dropwise addition of 5 mmol of tert-butyl lithium. Then polymerization was carried out at −78° C. After 3 hours, 6 mmol of 3-chloro-1-propene was added dropwise and polymerization was carried out for 2 hours at −78° C. When the reaction was complete, the resultant was precipitated in excess methanol and dried in vacuum, at which point 7.5 g of styrene macromonomer was obtained. The degree of polymerization of the macromonomer analyzed by NMR was 20.

Example 1B

A styrene macromonomer having a degree of polymerization of 40 was prepared in the same manner as in Example 1A, except that 2.5 mmol of tert-butyl lithium was used as the initiator and 3.0 mmol of 3-chloro-1-propene was used as the endcapping reagent.

Example 1C

A styrene macromonomer having a degree of polymerization of 100 was prepared in the same manner as in Example 1A, except that 1 mmol of tert-butyl lithium was used as the initiator and 1.2 mmol of 3-chloro-1-propene was used as the endcapping reagent.

Example 1D

A styrene macromonomer having a degree of polymerization of 1000 was prepared in the same manner as in Example 1A, except that 0.1 mmol of tert-butyl lithium was used as the initiator and 0.12 mmol of 3-chloro-1-propene was used as the endcapping reagent.

EXAMPLE 2

Preparation of Isoprene Macromonomer

Example 2A

To a 500 ml glass reactor, which had been dried under nitrogen atmosphere, were added 80 ml of toluene and 10 ml of isoprene (0.1 mol), followed by dropwise addition of 5 mmol of tert-butyl lithium. Then polymerization was carried out at −78° C. After 3 hours, 6 mmol of 3-chloro-1-propene was added dropwise and polymerization was carried out for 2 hours at −78° C. When the reaction was complete, the resultant was precipitated in excess methanol and dried in vacuum, at which point 7 g of isoprene macromonomer was obtained. The degree of polymerization of the macromonomer analyzed by NMR was 20.

Example 2B

An isoprene macromonomer having a degree of polymerization of 40 was prepared in the same manner as in Example 2A except that 2.5 mmol of tert-butyl lithium was used as the initiator and 3.0 mmol of 3-chloro-1-propene was used as the endcapping reagent.

Example 2C

An isoprene macromonomer having a degree of polymerization of 100 was prepared in the same manner as in Example 2A except that 1 mmol of tert-butyl lithium was used as the initiator and 1.2 mmol of 3-chloro-1-propene was used as the endcapping reagent.

Example 2D

An isoprene macromonomer having a degree of polymerization of 1000 was prepared in the same manner as in Example 2A except that 0.1 mmol of tert-butyl lithium was used as the initiator and 0.12 mmol of 3-chloro-1-propene was used as the endcapping reagent.

EXAMPLE 3

Preparation of Styrene-isoprene Block Macromonomer

Example 3A

To a 500 ml glass reactor which had been dried under nitrogen atmosphere, were added 80 ml of toluene and 11.5 ml of styrene (0.1 mol), followed by dropwise addition of 2.5 mmol of tert-butyl lithium. Then polymerization was carried out at −78° C. After 3 hours, 10 ml of isoprene 0.1 mol was added dropwise and polymerization was carried out for 2 hours at −78° C. and 3.0 mmol of 3-chloro-1-propene was used as the endcapping reagent. When the reaction was complete, the resultant was precipitated in excess methanol and dried in vacuum, at which point 18 g of styrene-isoprene block macromonomer was obtained. The degrees of polymerization of styrene block and isoprene block in the macromonomer analyzed by NMR was 40 and 40, respectively.

Example 3B

Styrene-isoprene block macromonomers having degrees of polymerization of 40–100 were prepared in the same manner as in Example 3A. To a 500 ml glass reactor which had been dried under nitrogen atmosphere, were added 80 ml of toluene and 11.5 ml of styrene (0.1 mol), followed by dropwise addition of 2.5 mmol of tert-butyl lithium. Then polymerization was carried out at −78° C. After 3 hours, 25 ml of isoprene 0.25 mmol was added dropwise and polymerization was carried out for 2 hours at −78° C., and 3.0 mmol of 3-chloro-1-propene was used as the endcapping reagent.

Example 3C

Styrene-isoprene block macromonomers having degrees of polymerization of 100—100 was prepared in the same manner as in Example 3A. To a 500 ml glass reactor which had been dried under nitrogen atmosphere, were added 80 ml of toluene and 28.75 ml of styrene 0.25 mol, followed by dropwise addition of 2.5 mmol of tert-butyl lithium. Then polymerization was carried out at −78° C. After 3 hours, 25 ml of isoprene 0.25 mol was added dropwise and polymerization was carried out for 2 hours at −78° C., and 3.0 mmol of 3-chloro-1-propene was used as the endcapping reagent.

Example 3D

Styrene-isoprene block macromonomers having degrees of polymerization of 1000—1000 were prepared in the same manner as in Example 3A. To a 1000 ml glass reactor which had been dried under nitrogen atmosphere, were added 500 ml of toluene and 57.5 ml of styrene 0.5 mol, followed by dropwise addition of 0.5 mmol of tert-butyl lithium. Then polymerization was carried out at −78° C. After 10 hours, 50 ml of isoprene 0.5 mol was added dropwise and polymerization was carried out for 10 hours at −78° C., and 1.0 mmol of 3-chloro-1-propene was used as the endcapping reagent.

Example 3E

Isoprene-styrene block macromonomers having degrees of polymerization of 40–100 were prepared in the same manner as in Example 3B. To a 500 ml glass reactor which had been dried under nitrogen atmosphere, were added 80 ml of toluene and 20 ml of isoprene 0.2 mol, followed by dropwise addition of 5.0 mmol of tert-butyl lithium. Then polymerization was carried out at −78° C. After 3 hours, 57.5 ml of styrene 0.5 mol was added dropwise and polymerization was carried out for 2 hours at −78° C., and 6.0 mmol of 3-chloro-1-propene was used as the endcapping reagent.

Example 3F

Isoprene-styrene block macromonomers having degrees of polymerization of 100—100 were prepared in the same manner as in Example 3C. To a 500 ml glass reactor which had been dried under nitrogen atmosphere, were added 80 ml of toluene and 50 ml of isoprene 0.5 mol, followed by dropwise addition of 5.0 mmol of tert-butyl lithium. Then polymerization was carried out at −78° C. After 3 hours, 57.5 ml of styrene 0.5 mol was added dropwise and polymerization was carried out for 2 hours at −78° C., and 6.0 mmol of 3-chloro-1-propene was used as the endcapping reagent.

Example 3G

Isoprene-styrene block macromonomers having degrees of polymerization of 1000—1000 were prepared in the same manner as in Example 3D. To a 1000 ml glass reactor which had been dried under nitrogen atmosphere, were added 500 ml of toluene and 50 ml of isoprene 0.5 mol followed by dropwise addition of 0.5 mmol of tert-butyl lithium. Then polymerization was carried out at −78° C. After 10 hours, 57.5 ml of styrene 0.5 mol was added dropwise and polymerization was carried out for 10 hours at −78° C., and 1.0 mmol of 3-chloro-1-propene was used as the endcapping reagent.

Example 3H

Isoprene-styrene block macromonomers having degrees of polymerization of 25—25 were prepared in the same manner as in Example 3D. To a 1000 ml glass reactor which had been dried under nitrogen atmosphere, were added 500 ml of toluene and 50 ml of isoprene 0.5 mol, followed by dropwise addition of 20.0 mmol of tert-butyl lithium. Then polymerization was carried out at −78° C. After 10 hours, 57.5 ml of styrene 0.5 mol was added dropwise and polymerization was carried out for 10 hours at −78° C., and 30.0 mmol of 3-chloro-1-propene was used as the endcapping reagent.

Example 3I

Isoprene-styrene block macromonomers having degrees of polymerization of 50—50 were prepared in the same manner as in Example 3D. To a 1000 ml glass reactor which had been dried under nitrogen atmosphere, were added 500 ml of toluene and 50 ml of isoprene 0.5 mol, followed by dropwise addition of 10.0 mmol of tert-butyl lithium. Then polymerization was carried out at −78° C. After 10 hours, 57.5 ml of styrene 0.5 mol was added dropwise and polymerization was carried out for 10 hours at −78° C., and 15.0 mmol of 3-chloro-1-propene was used as the endcapping reagent

EXAMPLE 4

Preparation of Styrene-isoprene Random Macromonomer

Example 4A

To a 500 ml glass reactor which had been dried under nitrogen atmosphere, were added 80 ml of toluene, 57.5 ml of styrene(0.5 mol), and 50.0 ml of isoprene(0.5 mol), followed by dropwise addition of 1.0 mmol of tert-butyl lithium. Then polymerization was carried out at −78° C. After 5 hours, 1.5 mmol of 3-chloro-1-propene was used as the endcapping reagent.

EXAMPLE 5

Preparation of Siloxane Macromonomer

Example 5A

To a 500 ml glass reactor which had been dried under nitrogen atmosphere, were added 80 ml of toluene and 20 g of hexamethyl cyclotrisiloxane, followed by dropwise addition of 5 mmol of tert-butyl lithium. Then polymerization was carried out at −78° C. After 3 hours, 6 mmol of 3-chloro-1-propene was added dropwise and polymerization was carried out for 2 hours at −78° C. When the reaction was complete, the resultant was precipitated in excess methanol and dried in vacuum, at which point 15 g of siloxane macromonomer was obtained. The degree of polymerization of the macromonomer analyzed by NMR was 20.

Example 5B

A siloxane macromonomer having a degree of polymerization of 40 was prepared in the same manner as in Example 5A except that 2.5 mmol of tert-butyl lithium was used as the initiator and 3.0 mmol of 3-chloro-1-propene was used as the endcapping reagent.

EXAMPLE 6

Preparation of Methyl Methacylate Macromonomer

Example 6A

To a 500 ml glass reactor which had been dried under nitrogen atmosphere, were added 80 ml of toluene and 10.7 ml of methyl methacylate, followed by dropwise addition of 5 mmol of sec-butyl lithium. Then polymerization was carried out at −78° C. After 3 hours, 6 mmol of 3-chloro-1-propene was added dropwise and polymerization was carried out for 2 hours at −78° C. When the reaction was complete, the resultant was precipitated in excess methanol and dried in vacuum, at which point 7 g of methyl methacylate macromonomer was obtained. The degree of polymerization of the macromonomer analyzed by NMR was 20.

Example 6B

A methyl methacylate macromonomer having a degree of polymerization of 10 was prepared in the same manner as in Example 6A except that 10 mmol of sec-butyl lithium was used as the initiator and 12 mmol of 3-chloro-1-propene was used as the endcapping reagent.

Example 6C

A methyl methacylate macromonomer having a degree of polymerization of 40 was prepared in the same manner as in Example 6A except that 2.5 mmol of sec-butyl lithium was used as the initiator and 3.0 mmol of 3-chloro-1-propene was used as the endcapping reagent.

EXAMPLE 7

Preparation of n-Butylmethacrylate Macromonomer n-Butyl methacrylate macromonomers having various degrees of polymerization were prepared in the same manner as in Example 6C except that n-butyl methacrylate was used instead of methyl methacrylate.

EXAMPLE 8

Preparation of Styrene/n-butyl Methacrylate Block Macromonomer

Styrene/n-butyl methacrylate block macromonomers having various degrees of polymerization were prepared in the same manner as in Example 3 except that n-butyl methacrylate was used instead of isoprene.

EXAMPLE 9

Preparation of Styrene/macromonomer Random Copolymer

Example 9(A) to 9(T)

To a 500 ml glass reactor which had been dried under nitrogen atmosphere, were added 80 ml of toluene, 5 ml of styrene, and 0.5 g of styrene macromonomer (degree of polymerization: 20) dissolved in toluene. Next, 5 mmol of modified aluminoxane were added dropwise, followed by addition of $10\mu$ mol of 1,2,3,4,5-pentamethyl cyclopentadienyl titanium trichloride. Then polymerization was carried out at 70° C.

After 30 minutes, the resultant was introduced to excess methanol and then washed with methanol and dried. The fraction insoluble extracted by methyl ethyl ketone was 92% by weight. The weight average molecular weight of the prepared polymer was 200,000 and the melting point was 268° C. The amount of styrene macromonomer analyzed by $^{13}$C-NMR was 7% by weight. The results of the polymerization are disclosed in Table 1. Also copolymerization using isoprene macromonomer, styrene/isoprene block macromonomer, isoprene/styrene block monomer, styrene/isoprene random macromonomer, siloxane macromonomer, methyl methacrylate macromonomer, n-butyl methacrylate macromonomer and styrene/n-butyl methacrylate block macromonomer were carried out in the same manner as in Example 9 and the results are disclosed in Table 1.

COMPARATIVE EXAMPLE 1

A styrene homopolymerization was carried out in the same manner as in Example 9 and the results are disclosed in Table 1.

TABLE 1

| Example | monomer | macromonomer | degree of polymerization of macromonomer | yield (g) | amount of macromonomer (wt %) | melting point (° C.) | weight average molecular weight | fraction insoluble (wt %) |
|---|---|---|---|---|---|---|---|---|
| 9(A) | styrene | Example 1A | 20 | 3.2 | 7.0 | 268 | 200000 | 93 |
| 9(B) | styrene | Example 1B | 40 | 3.2 | 6.9 | 265 | 195000 | 93 |
| 9(C) | styrene | Example 1C | 100 | 3.2 | 6.8 | 264 | 197000 | 92 |
| 9(D) | styrene | Example 1D | 1000 | 3.3 | 7.0 | 264 | 196000 | 93 |
| 9(E) | styrene | Example 2A | 20 | 3.4 | 7.2 | 263 | 198000 | 93 |

TABLE 1-continued

| Example | monomer | macro-monomer | degree of polymerization of macromonomer | yield (g) | amount of macro-monomer (wt %) | melting point (° C.) | weight average molecular weight | fraction insoluble (wt %) |
|---|---|---|---|---|---|---|---|---|
| 9(F) | styrene | Example 2B | 40 | 3.3 | 6.8 | 263 | 201000 | 94 |
| 9(G) | styrene | Example 2C | 100 | 3.3 | 6.2 | 259 | 189000 | 93 |
| 9(H) | styrene | Example 2D | 1000 | 3.4 | 7.6 | 257 | 192000 | 92 |
| 9(I) | styrene | Example 3A | 40–40 | 3.1 | 7.2 | 263 | 178000 | 92 |
| 9(J) | styrene | Example 3B | 40–100 | 3.3 | 6.7 | 264 | 187000 | 92 |
| 9(K) | styrene | Example 3C | 100–100 | 3.4 | 6.4 | 261 | 196000 | 91 |
| 9(L) | styrene | Example 3D | 1000–1000 | 3.4 | 6.9 | 262 | 178000 | 92 |
| 9(M) | styrene | Example 4A | 40–40 | 3.4 | 6.3 | 265 | 200000 | 92 |
| 9(N) | styrene | Example 3E | 40–100 | 3.3 | 6.6 | 263 | 198000 | 93 |
| 9(O) | styrene | Example 3F | 100–100 | 3.3 | 6.5 | 264 | 196000 | 92 |
| 9(P) | styrene | Example 3G | 1000–1000 | 3.4 | 6.9 | 261 | 196000 | 93 |
| 9(R) | styrene | Example 5A | 20 | 2.1 | 3.1 | 271 | 168000 | 94 |
| 9(S) | styrene | Example 6A | 20 | 2.5 | 4.2 | 269 | — | — |
| 9(T) | styrene | Example 7 | 40 | 3.2 | 4.5 | 270 | 195000 | 92 |
| Comp. Ex. 1 | styrene | — | — | 2.9 | — | 275 | 198000 | 97 |

EXAMPLE 10A–10D

Preparation of Terpolymer

Example 10A

To a 1 liter glass reactor with a mechanical agitator, which had been dried under nitrogen atmosphere, were added styrene (196 ml) and tert-butylstyrene (4 ml), and isoprene-styrene block macromonomer (degree of polymerization 25—25 of Example 3H) (5 grams) dissolved in toluene. Modified aluminoxane (3 mmol) was added dropwise to the reactor, which was kept at 70° C., and $(Cp*Ti)_2(OC_6H_4C(CH_3)_2C_6H_4O)_3$ (15 μmol) was added to initiate prepolymerization Polymerization was continued at 400 rpm for one hour. A solid polymer was obtained and was washed with excess of methanol and dried. The polymer after extracting with methyl ethyl ketone was 92 weight %.

The weight average molecular weight of the terpolymer obtained was 400,000, and the melting point was 250° C. As a result of analyzing $^{13}C$-NMR, the amount of isoprene-styrene macromonomer was 2.45% by weight and that of tert-butylstyrene was 1.69 mol %. The resulting data are shown in Table 2.

Example 10B

The polymerization for preparing a terpolymer was conducted in the same manner as in Example 10A except that isoprene-styrene block macromonomer with a degree of polymerization 50—50 of Example 31 was used. The resulting data are shown in Table 2.

Example 10C

The polymerization for preparing a terpolymer was conducted in the same manner as in Example 10A except that isoprene-styrene block macromonomer with a degree of polymerization 100—100 of Example 3F was used. The resulting data are shown in Table 2.

Example 10D

The polymerization for preparing a terpolymer was conducted in the same manner as in Example 10A except that isoprene-styrene block macromonomer with a degree of polymerization 1000—1000 of Example 3G was used. The resulting data were shown in Table 2.

COMPARATIVE EXAMPLE 2A–2C

Comparative Example 2A

The polymerization for preparing a styrene homopolymer was conducted in the same manner as in Example 10A except that tert-butylstyrene and isoprene-styrene block macromonomer were not used. The resulting data are shown in Table 2.

Comparative Example 2B

The polymerization for preparing a styrene/tert-butylstyrene copolymer was conducted in the same manner as in Example 10A except that isoprene-styrene block macromonomer was not used. The resulting data were shown in Table 2.

Comparative Example 2C

The polymerization for preparing a styrene copolymer was conducted in the same manner as in Example 10A except that tert-butylstyrene was not used, but isoprene-styrene block macromonomer with a degree of polymerization 1000—1000 was used. The resulting data are shown in Table 2.

TABLE 2

| | Styrene derivative | Styrene derivative (wt %) | Macro-monomer | Degree of polymerization of macromonomer | amount of macro-monomer (wt %) | Melting Point (° C.) | Activity (kgPS/molTi hr) |
|---|---|---|---|---|---|---|---|
| Example 10A | t-BuSt | 1.69 | Example 3H | 25–25 | 2.45 | 250 | 640 |

TABLE 2-continued

| | Styrene derivative | Styrene derivative (wt %) | Macro-monomer | Degree of polymerization of macromonomer | amount of macro-monomer (wt %) | Melting Point (° C.) | Activity (kgPS/molTi hr) |
|---|---|---|---|---|---|---|---|
| Example 10B | t-BuSt | 1.84 | Example 3I | 50–50 | 5.35 | 252 | 1088 |
| Example 10C | t-BuSt | 1.58 | Example 3F | 100–100 | 6.78 | 253 | 1372 |
| Example 10D | t-BuSt | 1.72 | Example 3G | 1000–1000 | 8.20 | 254 | 1654 |
| Comp. Ex. 2A | — | — | — | — | — | 273 | 1414 |
| Comp. Ex. 2B | t-BuSt | 1.95 | — | — | — | 255 | 2078 |
| Comp. Ex. 2C | — | — | Example 3E | 1000–1000 | 7.80 | 269 | 1255 |

The melting point, molecular weight, amount of macromonomer, and fraction insoluble were obtained by the following methods:

(1) Melting Point

After keeping the temperature at 300° C. for 3 minutes, the melting point was measured by DuPont DSC (Differential Scanning Calorimeter) heating the polymer at the rate of 10° C. increase per minute.

(2) Molecular Weight

The molecular weight of the polymer was measured by PL-GPC (Mixed B column) at 135° C. using 1,2,4-trichlorobenzene as a solvent.

(3) Amount of Macromonomer

The mount of macromonomer in the copolymer was measured by Bruker NMR-300 at 115° C. using 1,2,4-trichlorobenzene/benzene-d6 as a solvent at 115° C.

(4) Fraction Insoluble

Fraction insoluble was represented as weight % using methyl ethyl ketone as a solvent.

Figure 2:
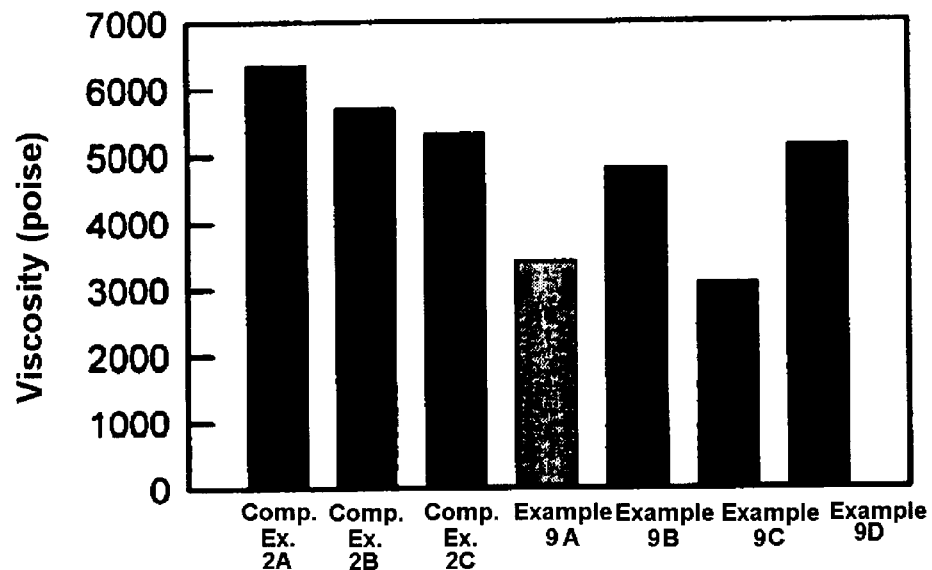
FIG. 2 is a graph of shear viscosity, measured at 290° C., of the random terpolymers of Examples 10(A)–10(D) and of styrene homopolymer and copolymer of Comparative Examples 2(A)–2(C) to measure the melt flowability of the random terpolymer.

(5) Melt Flowability:

Shear viscosity was measured by Capillary Rheometry at 290° C. in the range of 1~$10^4$ (sec$^{-1}$) of shear rate. The shear viscosity was shown in FIG. 2 and Table 3 to measure the melt flowability of styrene random terpolymers. The shear viscosities of the random terpolymer of Example 10A–10D and the styrene homopolymer and copolymers of Comparative Example 2A–2C were measured at 290° C. As shown in FIG. 2, the shear viscosities of styrene random terpolymer were much lower than those of styrene homopolymer irrespective of shear rates.

Figure 3:
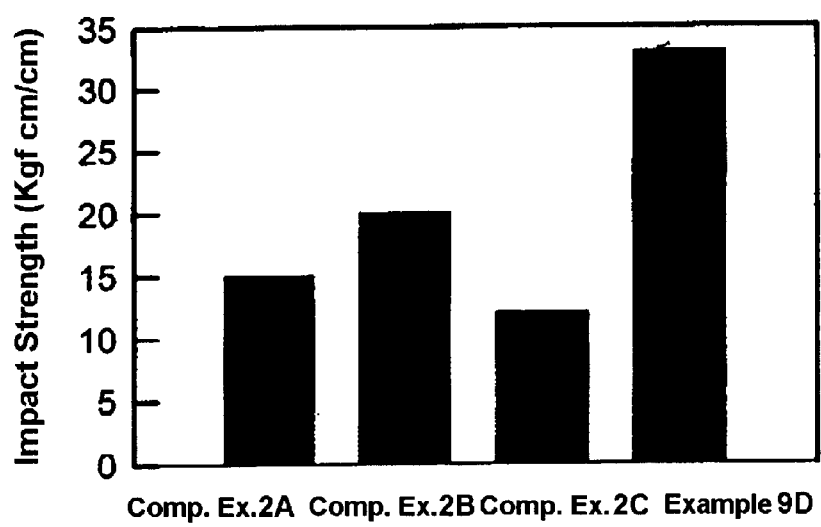
FIG. 3 is a graph of Izod impact strength of the random terpolymers of Examples 10(D) and of the styrene homopolymer and copolymer of Comparative Examples 2(A)–2(C) to measure the impact strength of the random terpolymer.

(6) Izod Impact Strength:

To 35 grams of the random terpolymers of Example 10D and the styrene homopolymer and copolymers of Comparative Example 2A–2C, respectively, was added 15 grams SEBS, and each composition was blended in a mixer at 50 rpm at 280° C. for 5 minutes. Each specimen for impact strength was prepared and tested according to ASTM 256-D. The resulting data were shown in Table 3 and in FIG. 3.

The shear viscosity was shown in FIG. 1 to measure the melt flowability of styrene random copolymers. The shear viscosities of the random copolymer of Example 9(A), 9(E), and 9(K) and the styrene homopolymer of the Comparative Example were measured at 290° C. As shown in FIG. 1, the shear viscosities of styrene random copolymers were much lower than those of styrene homopolymer irrespective of shear rates.

TABLE 3

| | Example | | | | Comp. Ex. | | |
|---|---|---|---|---|---|---|---|
| | 10A | 10B | 10C | 10D | 2A | 2B | 2C |
| Flow viscosity (poise) | 3428 | 4805 | 3075 | 5123 | 6364 | 5713 | 5321 |
| 1/8' Notch Impact Strength (kg · cm/cm) | — | — | — | 33 | 16 | 20 | 12 |

The present invention has been described based on preferred embodiments of the present invention, but it should be apparent to those ordinarily skilled in the art that various changes and modifications can be made without departing from the spirit and scope of the present invention. Such changes modifications come within the scope of the present invention.

What is claimed is:

1. A styrene random copolymer comprising at least one unit of styrene derivative and at least one unit of macromonomer, said at least one unit of styrene derivative being polymerized from a styrene derivative monomer of formula (1), said at least one unit of macromonomer being polymerized from a macromonomer of formula (2),

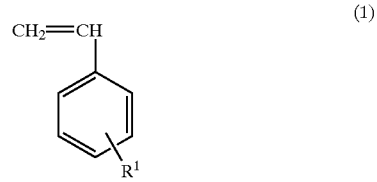
(1)

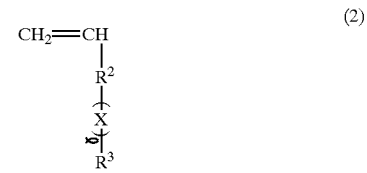
(2)

wherein $R^1$ is selected from the group consisting of hydrogen, halogen, and alkyl groups with 1~20 carbon atoms, $R^2$ is at least one selected from the group consisting of saturated hydrocarbons with 1~20 carbon atoms, aromatic groups, and cycloalkyl groups with the proviso that $R^2$ is not —CO— or —$CH_2$—$C_6H_4$—, $R^3$ is a saturated hydrocarbon group with 1~10 carbon atoms, X is at least one ion polymerizable monomer unit selected from the group consisting of monomers of formulae (A) to (K):

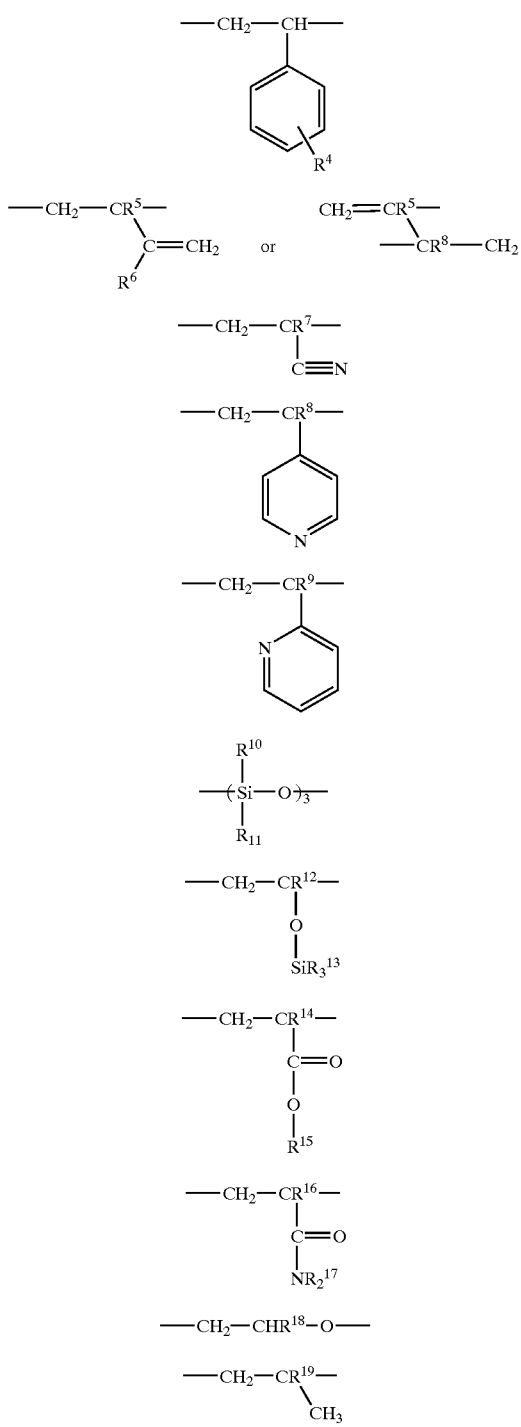

$R^4$, $R^5$, $R^6$, $R^7$, $R^8$, and $R^9$ are the same or different and are selected from the group consisting of hydrogen, halogen, alkyl groups with 1~20 carbon atoms, and alkoxy groups with 1~20 carbon atoms, $R^{10}$, $R^{11}$, $R^{12}$, $R^{13}$, $R^{16}$, and $R^{17}$ are the same or different and are selected from the group consisting of alkyl groups with 1~20 carbon atoms, $R^{14}$ and $R^{15}$ are the same or different and are selected from the group consisting of hydrogen and alkyl groups with 1~20 carbon atoms, $R^{18}$ is selected from the group consisting of hydrogen and alkyl groups with 1~4 carbon atoms, $R^{19}$ is selected from the group consisting of alkyl groups with 1~4 carbon atoms, and l is the degree of polymerization for X and is an integer from about 10 to about 1,000, wherein the amount of the macromonomer is 0.1~50% by weight based on the weight of the random copolymer, and wherein the weight average molecular weight of the random copolymer ranges from about 50,000 to about 2,000,000.

2. The styrene random copolymer according to claim 1, wherein said styrene derivative is selected from the group consisting of styrene, o-, m-, and p-chlorostyrene, o-, m-, and p-bromostyrene, o-, m-, and p-fluorostyrene, o-, m-, and p-methylstyrene, o-, m-, and p-ethylstyrene, o-, m-, and p-propylstyrene, o-, m-, and p-butylstyrene, and o-, m-, and p-tert-butylstyrene.

3. The styrene random copolymer according to claim 1, wherein said styrene derivative units have at least 50% syndiotacticity.

4. The styrene random copolymer according to claim 1, wherein said macromonomer is ion-polymerized from an ion polymerizable monomer of formula (a)

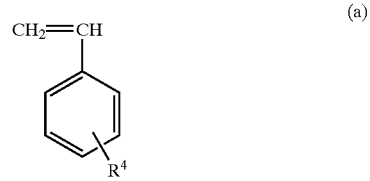

wherein $R^4$ is selected from the group consisting of hydrogen, halogen, alkyl groups with 1~20 carbon atoms, and alkoxy groups with 1~20 carbon atoms, and has a weight average molecular weight ranging from 1,000~200,000.

5. The styrene random copolymer according to claim 1, wherein said macromonomer is ion-polymerized from an ion polymerizable monomer of formula (b)

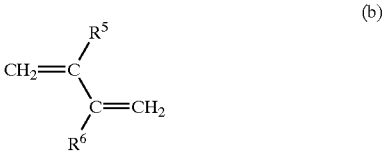

wherein $R^5$ and $R^6$ are the same or different and are selected from the group consisting of hydrogen, halogen, alkyl groups with 1~20 carbon atoms, and alkoxy groups with 1~20 carbon atoms, and has a weight average molecular weight ranging from 1,000~200,000.

6. The styrene random copolymer according to claim 1, wherein said macromonomer is ion-polymerized from an ion polymerizable monomer of formula (c)

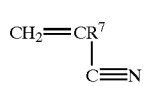

wherein $R^7$ is selected from the group consisting of hydrogen, halogen, alkyl groups with 1~20 carbon atoms, and alkoxy groups with 1~20 carbon atoms, and has a weight average molecular weight ranging from 1,000~200,000.

7. The styrene random copolymer according to claim 1, wherein said macromonomer is ion-polymerized from an ion polymerizable monomer of formula (d)

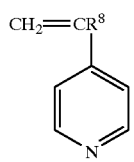

wherein $R^8$ is selected from the group consisting of hydrogen, halogen, alkyl groups with 1~20 carbon atoms, and alkoxy groups with 1~20 carbon atoms, and has a weight average molecular weight ranging from 1,000~200,000.

8. The styrene random copolymer according to claim 1, wherein said macromonomer is ion-polymerized from an ion polymerizable monomer of formula (e)

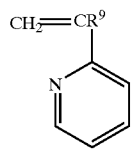

wherein $R^9$ is selected from the group consisting of hydrogen, halogen, alkyl groups with 1~20 carbon atoms, and alkoxy groups with 1~20 carbon atoms, and has a weight average molecular weight ranging from 1,000~200,000.

9. The styrene random copolymer according to claim 1, wherein said macromonomer is ion-polymerized from an ion polymerizable monomer of formula (f)

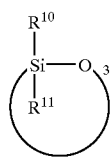

wherein $R^{10}$ and $R^{11}$ are the same or different and are selected from the group consisting of alkyl groups with 1~20 carbon atoms, and has a weight average molecular weight ranging from 1,000~200,000.

10. The styrene random copolymer according to claim 1, wherein said macromonomer is ion-polymerized from an ion polymerizable monomer of formula (g)

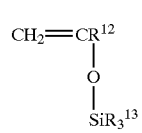

wherein $R^{12}$ and $R^{13}$ are the same or different and are selected from the group consisting of alkyl groups with 1~20 carbon atoms, and has a weight average molecular weight ranging from 1,000~200,000.

11. The styrene random copolymer according to claim 1, wherein said macromonomer is ion-polymerized from an ion polymerizable monomer of formula (h)

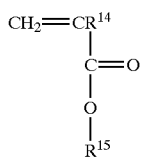

wherein $R^{14}$ and $R^{15}$ are the same or different and are selected from the group consisting of hydrogen and alkyl groups with 1~20 carbon atoms, and has a weight average molecular weight ranging from 1,000~200,000.

12. The styrene random copolymer according to claim 1, wherein said macromonomer is ion-polymerized from an ion polymerizable monomer of formula (i)

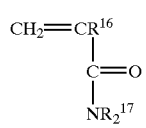

wherein $R^{16}$ and $R^{17}$ are the same or different and are selected from the group consisting of alkyl groups with 1~20 carbon atoms, and has a weight average molecular weight ranging from 1,000~200,000.

13. The styrene random copolymer according to claim 1, wherein said macromonomer is ion-polymerized from an ion polymerizable monomer of formula (j)

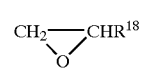

wherein $R^{18}$ is selected from the group consisting of hydrogen and alkyl groups with 1~4 carbon atoms, and has a weight average molecular weight ranging from 1,000~200,000.

14. The styrene random copolymer according to claim 1, wherein said macromonomer is ion-polymerized from an ion polymerizable monomer of formula (k)

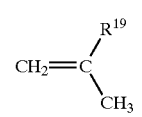

wherein $R^{19}$ is selected from the group consisting of alkyl groups with 1~4 carbon atoms, and has a weight average molecular weight ranging from 1,000~200,000.

15. The styrene random copolymer according to claim 1, wherein said macromonomer is copolymerized from at least two ion polymerizable monomers.

16. The styrene random copolymer according to claim 1, wherein said macromonomer is selected from the group consisting of homo, random, and block macromonomers.

17. A process for preparing a styrene random copolymer comprising at least one unit of styrene derivative and at least one unit of macromonomer, said at least one unit of styrene derivative being polymerized from a styrene derivative monomer of formula (1), said at least one unit of macromonomer being polymerized from a macromonomer of formula (2),

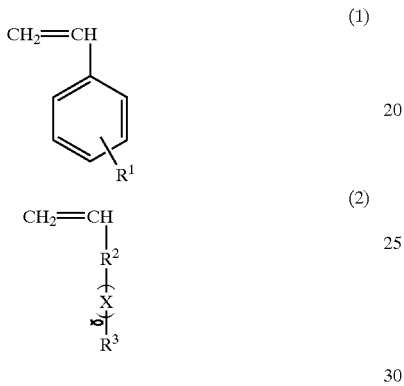

wherein $R^1$ is selected from the group consisting of hydrogen, halogen, and alkyl groups with 1~20 carbon atoms, $R^2$ is at least one selected from the group consisting of saturated hydrocarbons with 1~20 carbon atoms, aromatic groups, and cycloalkyl groups with the proviso that $R^2$ is not —CO— or —$CH_2$—$C_6H_4$—, $R^3$ is a saturated hydrocarbon group with 1~10 carbon atoms, X is at least one ion polymerizable monomer unit selected from the group consisting of monomers of formulae (A) to (K):

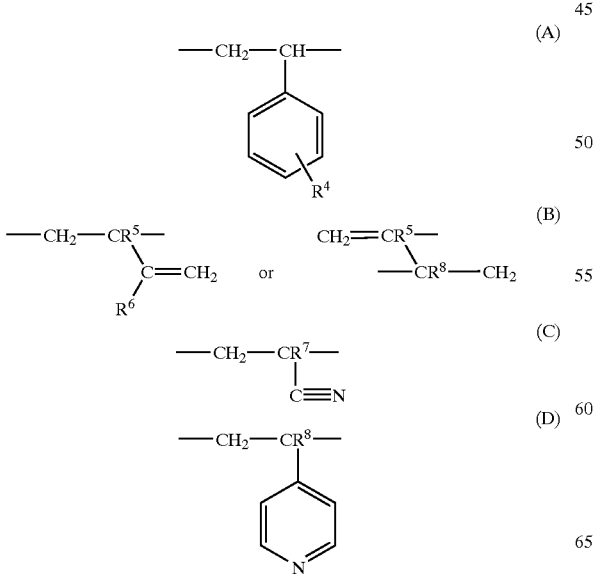

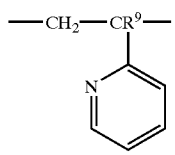

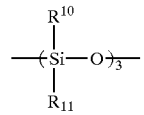

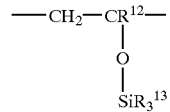

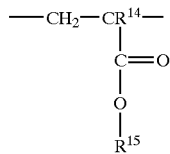

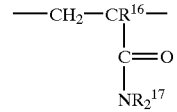

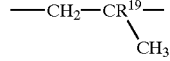

$R^4$, $R^5$, $R^6$, $R^7$, $R^8$, and $R^9$ are the same or different and are selected from the group consisting of hydrogen, halogen, alkyl groups with 1~20 carbon atoms, and alkoxy groups with 1~20 carbon atoms, $R^{10}$, $R^{11}$, $R^{12}$, $R^{13}$, $R^{16}$, and $R^{17}$ are the same or different and are selected from the group consisting of alkyl groups with 1~20 carbon atoms, $R^{14}$ and $R^{15}$ are the same or different and are selected from the group consisting of hydrogen and alkyl groups with 1~20 carbon atoms, $R^{18}$ is selected from the group consisting of hydrogen and alkyl groups with 1~4 carbon atoms, $R^{19}$ is selected from the group consisting of alkyl groups with 1~4 carbon atoms, and l is the degree of polymerization for X and is an integer from about 10 to about 1,000, wherein the amount of the macromonomer is 0.1~50% by weight based on the weight of the random copolymer, and wherein the weight average molecular weight of the random copolymer ranges from about 50,000 to about 2,000,000, said method comprising the step of polymerizing, in the presence of a catalyst system comprising a Group IV transition metal compound and an alkylaluminoxane, said styrene derivative monomer of formula (1) and said macromonomer of formula (2).

18. A styrene random terpolymer comprising units of styrene monomer, units of styrene derivative, and units of macromonomer, said units of styrene monomer being polymerized from a styrene monomer of formula ($1_s$), said units of styrene derivative being polymerized from a styrene derivative monomer of formula (1), said units of macromonomer being polymerized from a macromonomer of formula (2),

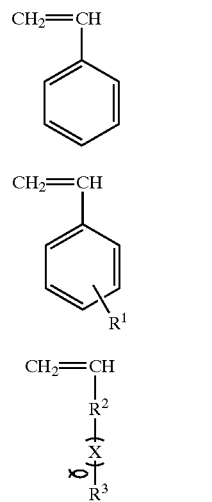

said terpolymer being represented by formula (III):

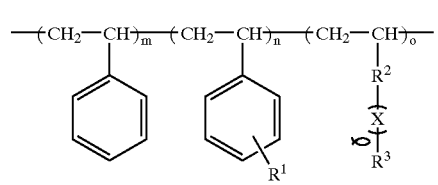

wherein

- $R^1$ is selected from the group consisting of hydrogen, halogen, and alkyl groups with 1~20 carbon atoms,
- $R^2$ is at least one selected from the group consisting of saturated hydrocarbons with 1~20 carbon atoms, aromatic groups, and cycloalkyl groups with the proviso that $R^2$ is not —CO— or —$CH_2$—$C_6H_4$—,
- $R^3$ is selected from the group consisting of saturated hydrocarbons with 1~10 carbon atoms,
- m is a degree of polymerization for the styrene monomer and is an integer of about 400 to about 20,000,
- n is a degree of polymerization for the styrene derivative monomer and is an integer of about 5 to about 200,
- o is a degree of polymerization for the macromonomer and is an integer of about 1 to about 20,
- l is the degree of polymerization for X and is an integer of about 10 to about 3,000, and
- X is at least one ion polymerizable monomer unit selected from the group consisting of monomers of formulae (A) to (K):

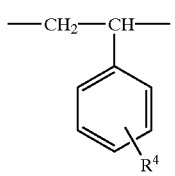

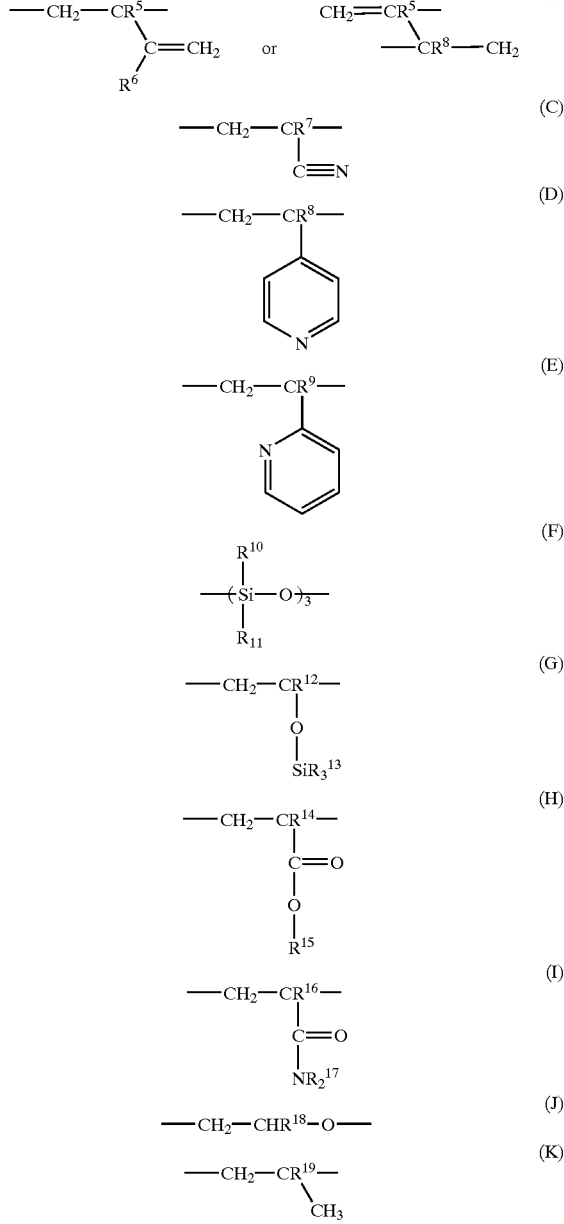

- $R^4$, $R^5$, $R^6$, $R^7$, $R^8$, and $R^9$ are the same or different and are selected from the group consisting of hydrogen, halogen, alkyl groups with 1~20 carbon atoms, and alkoxy groups with 1~20 carbon atoms,
- $R^{10}$, $R^{11}$, $R^{12}$, $R^{13}$, $R^{16}$, and $R^{17}$ are the same or different and are selected from the group consisting of alkyl groups with 1~20 carbon atoms,
- $R^{14}$ and $R^{15}$ are the same or different and chosen from hydrogen and alkyl groups with 1~20 carbon atoms,
- $R^{18}$ is selected from the group consisting of hydrogen and alkyl groups with 1~4 carbon atoms, and
- $R^{19}$ is selected from the group consisting of alkyl groups with 1~4 carbon atoms, wherein the amount of the macromonomer is 0.1~50% by weight based on the weight of the random terpolymer, and wherein the weight average molecular weight of the random terpolymer ranges from about 50,000 to about 5,000,000.

19. The styrene random terpolymer according to claim 18, wherein said styrene derivative monomer is chosen from the group consisting of o-, m-, and p-chlorostyrene, o-, m-, and p-bromostyrene, o-, m-, and p-fluorostyrene, o-, m-, and p-methylstyrene, o-, m-, and p-ethylstyrene, o-, m-, and p-propylstyrene, o-, m-, and p-butylstyrene, and o-, m-, and p-tert-butylstyrene.

20. The styrene random terpolymer according to claim 18, wherein said units of styrene monomer and styrene derivative monomer have at least 50% syndiotacticity.

21. The styrene random terpolymer according to claim 18, wherein said macromonomer is ion- polymerized from an ion polymerizable monomer of formula (a)

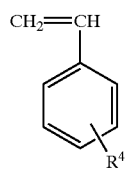

(a)

wherein $R^4$ is selected from the group consisting of hydrogen, halogen alkyl groups with 1~20 carbon atoms, and alkoxy groups with 1~20 carbon atoms, and has a weight average molecular weight ranging from 1,000~200,000.

22. The styrene random terpolymer according to claim 18, wherein said macromonomer is ion-polymerized from an ion polymerizable monomer of formula (b),

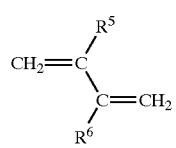

(b)

wherein $R^5$ and $R^6$ are the same or different and are selected from the group consisting of hydrogen, halogen, alkyl groups with 1~20 carbon atoms, and alkoxy groups with 1~20 carbon atoms, and has a weight average molecular weight ranging from 1,000~200,000.

23. The styrene random terpolymer according to claim 18, wherein said macromonomer is ion-polymerized from an ion polymerizable monomer of formula (c)

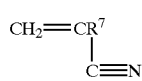

(c)

wherein $R^7$ is selected from the group consisting of hydrogen, halogen, alkyl groups with 1~20 carbon atoms, and alkoxy groups with 1~20 carbon atoms, and has a weight average molecular weight ranging from 1,000~200,000.

24. The styrene random terpolymer according to claim 18, wherein said macromonomer is ion-polymerized from an ion polymerizable monomer of formula (d)

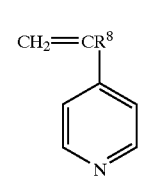

(d)

wherein $R^8$ is selected from the group consisting of hydrogen, halogen, alkyl groups with 1~20 carbon atoms and alkoxy groups with 1~20 carbon atoms.

25. The styrene random terpolymer according to claim 18, wherein said macromonomer is ion-polymerized from an ion polymerizable monomer of formula (e) wherein $R^9$ is selected from

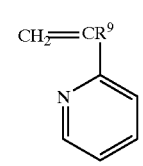

(e)

the group consisting of hydrogen, halogen, alkyl groups with 1~20 carbon atoms, and alkoxy groups with 1~20 carbon atoms, and has a weight average molecular weight ranging from 1,000~300,000.

26. The styrene random terpolymer according to claim 18, wherein said macromonomer is ion-polymerized from an ion polymerizable monomer of monomers of formula (f)

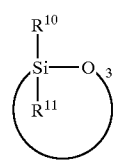

(f)

wherein $R^{10}$ and $R^{11}$ are the same or different and are selected from the group consisting of alkyl groups with 1~20 carbon atoms, and has a weight average molecular weigh ranging from 1,000~300,000.

27. The styrene random terpolymer according to claim 18, wherein said macromonomer is ion-polymerized from an ion polymerizable monomer of formula (g)

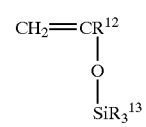

(g)

wherein $R^{12}$ and $R^{13}$ are the same or different and are selected from the group consisting of alkyl groups with 1~20 carbon atoms, and has a weight average molecular weight ranging from 1,000~300,000.

28. The styrene random terpolymer according to claim 18, wherein said macromonomer is ion-polymerized from an ion polymerizable monomer of formula (h)

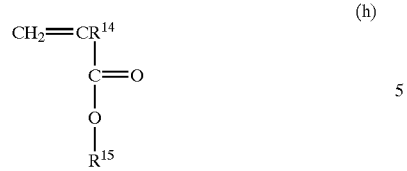

(h)

wherein $R^{14}$ and $R^{15}$ are the same or different and are selected from the group consisting of alkyl groups with 1~20 carbon atoms and hydrogen, and has a weight average molecular weight ranging from 1,000~300,000.

29. The styrene random terpolymer according to claim 18, wherein said macromonomer is ion-polymerized from an ion polymerizable monomer of formula (i)

(i)

wherein $R^{16}$ and $R^{17}$ are the same or different and are selected from the group consisting of alkyl groups with 1~20 carbon atoms, and has a weight average molecular weight ranging from 1,000~300,000.

30. The styrene random terpolymer according to claim 18, wherein said macromonomer is ion-polymerized from an ion polymerizable monomer of formula (j)

(j)

wherein $R^{18}$ is selected from the group consisting of hydrogen and alkyl groups with 1~4 carbon atoms, and has a weight average molecular weight ranging from 1,000~300,000.

31. The styrene random terpolymer according to claim 18, wherein said macromonomer is ion-polymerized from an ion polymerizable monomer of formula (k)

(k)

wherein $R^{19}$ is selected from the group consisting of alkyl groups with 1~4 carbon atoms, and has a weight average molecular weight ranging from 1,000~300,000.

32. The styrene random terpolymer according to claim 18, wherein said macromonomer is copolymerized from at least two ion polymerizable monomers.

33. The styrene random terpolymer according to claim 18, wherein said macromonomer is selected from the group consisting of homo, random, and block macromonomers.

34. A process for preparing a styrene random terpolymer comprising units of styrene monomer, units of styrene derivative, and units of macromonomer, said units of styrene monomer being polymerized from a styrene monomer of formula ($1_s$), said units of styrene derivative being polymerized from a styrene derivative monomer of formula (1), said units of macromonomer being polymerized from a macromonomer of formula (2),

(1s)

(1)

(2)

said terpolymer being represented by formula (III):

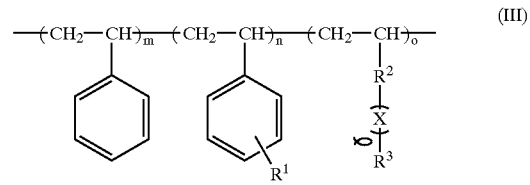

(III)

wherein $R^1$ is selected from the group consisting of hydrogen, halogen, and alkyl groups with 1~20 carbon atoms, $R^2$ is at least one selected from the group consisting of saturated hydrocarbons with 1~20 carbon atoms, aromatic groups, and cycloalkyl groups with the proviso that $R^2$ is not —CO— or —$CH_2$—$C_6H_4$—, $R^3$ is selected from the group consisting of saturated hydrocarbons with 1~10 carbon atoms, m is a degree of polymerization for the styrene monomer and is an integer of about 400 to about 20,000, n is a degree of polymerization for the styrene derivative monomer and is an integer of about 5 to about 200, o is a degree of polymerization for the macromonomer and is an integer of about 1 to about 20, l is the degree of polymerization for X and is an integer of about 10 to about 3,000, and X is at least one ion polymerizable monomer unit selected from the group consisting of monomers of formulae (A) to (K):

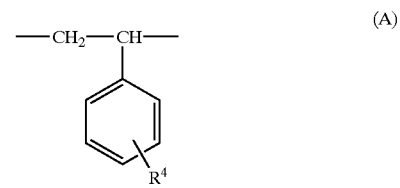

(A)

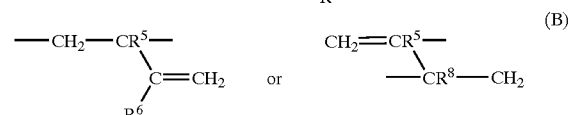

(B)

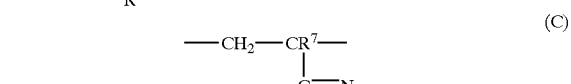

(C)

-continued

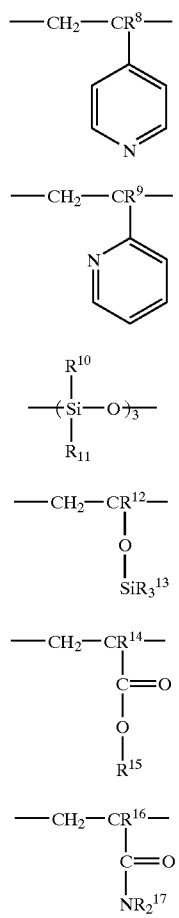

(D)

(E)

(F)

(G)

(H)

(I)

-continued

—CH$_2$—CHR$^{18}$—O— (J)

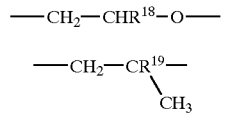

(K)

$R^4$, $R^5$, $R^6$, $R^7$, $R^8$, and $R^9$ are the same or different and are selected from the group consisting of hydrogen, halogen, alkyl groups with 1~20 carbon atoms, and alkoxy groups with 1~20 carbon atoms, $R^{10}$, $R^{11}$, $R^{12}$, $R^{13}$, $R^{16}$, and $R^{17}$ are the same or different and are selected from the group consisting of alkyl groups with 1~20 carbon atoms, $R^{14}$ and $R^{15}$ are the same or different and chosen from hydrogen and alkyl groups with 1~20 carbon atoms, $R^{18}$ is selected from the group consisting of hydrogen and alkyl groups with 1~4 carbon atoms, and $R^{19}$ is selected from the group consisting of alkyl groups with 1~4 carbon atoms, wherein the amount of the macromonomer is 0.1~50% by weight based on the weight of the random terpolymer, and wherein the weight average molecular weight of the random terpolymer ranges from about 50,000 to about 5,000,000, said process comprising the step of polymerizing, in the presence of a catalyst system comprising a Group IV transition metal compound and an alkylaluminoxane, said styrene monomer of formula (1$_s$), said styrene derivative monomer of formula (1), and said macromonomer of formula (2).

* * * * *